United States Patent [19]
Spindt et al.

[11] 3,789,471
[45] Feb. 5, 1974

[54] FIELD EMISSION CATHODE STRUCTURES, DEVICES UTILIZING SUCH STRUCTURES, AND METHODS OF PRODUCING SUCH STRUCTURES

[75] Inventors: Charles A. Spindt, Menlo Park; Kenneth R. Shoulders, Woodside; Louis N. Heynick, Palo Alto, all of Calif.

[73] Assignee: Stanford Research Institute, Menlo Park, Calif.

[22] Filed: Jan. 3, 1972

[21] Appl. No.: 215,068

Related U.S. Application Data

[62] Division of Ser. No. 9,139, Feb. 6, 1970, Pat. No. 3,755,704.

[52] U.S. Cl. ................................. 29/25.17
[51] Int. Cl. ............................... H01j 9/02
[58] Field of Search 29/25.17, 25.18; 313/309, 351; 117/210, 212

[56] References Cited
UNITED STATES PATENTS
3,497,929 3/1970 Shoulders et al. ............... 29/25.17

OTHER PUBLICATIONS
C. A. Spindt, "A Thin–Film Field–Emission Cathode," Journ. of Applied Physics, Vol. 39, No. 7, June 1968, pp. 3504–3505.

*Primary Examiner*—Roy Lake
*Assistant Examiner*—J. W. Davie
*Attorney, Agent, or Firm*—Urban H. Faubion

[57] ABSTRACT

Vacuum devices incorporate electron or field forming sources formed by a cellular array of emission sites. The sources comprise a metal/insulator/metal film sandwich on a substrate with a cellular array of holes through the upper metal and insulator, leaving the edges of the upper metal electrode effectively exposed to the upper surface of the lower metal electrode. Sharp protuberances directed toward the upper electrode and constituting emitter tips of controlled configurations are formed on the exposed area of the lower electrode. A method of forming the structure includes starting with the metal/insulator/metal film sandwich having the cellular array of holes already formed and directing permanent electrode material into the cellular array of holes and masking or subsequently removable material onto the surface surrounding the holes whereby an individual sharp cone-like emitter is formed within each of the holes in the cellular array. Vacuum devices are formed from such structures. For example, a diode is formed either by making the masking material over each emission site an electrode or by removing the masking material and applying a conductive electrode material over each emission site.

2 Claims, 10 Drawing Figures

Patented Feb. 5, 1974
3,789,471
2 Sheets-Sheet 1
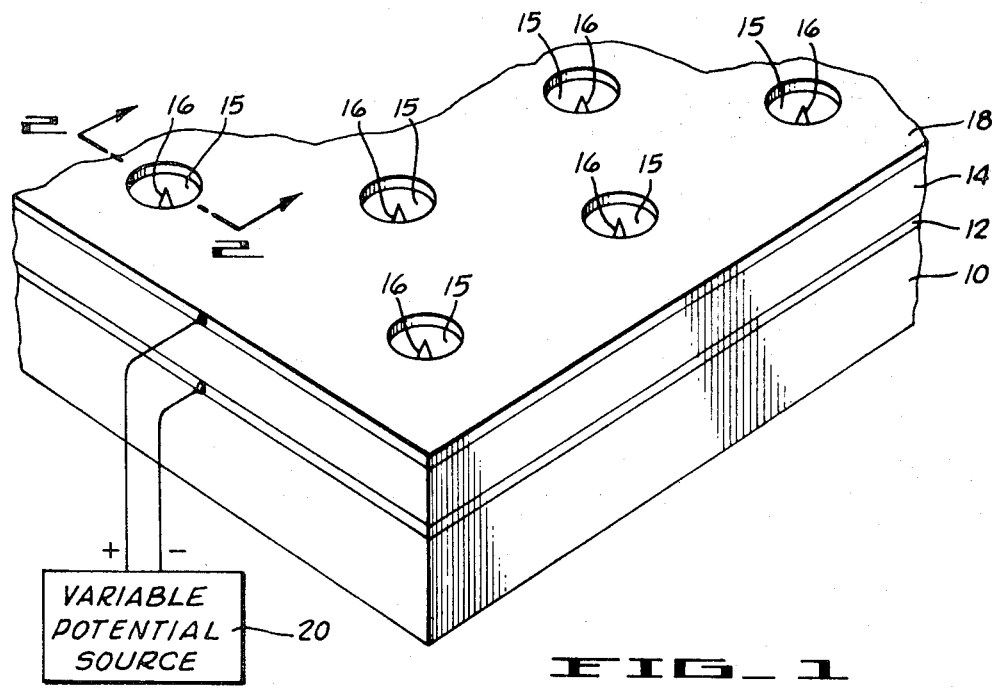
FIG_1
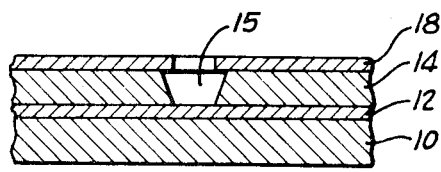
FIG_2
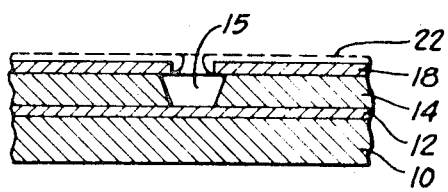
FIG_3
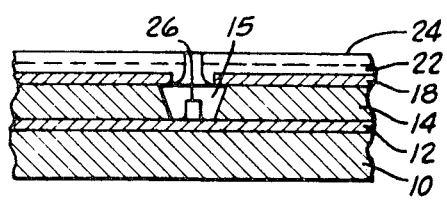
FIG_4
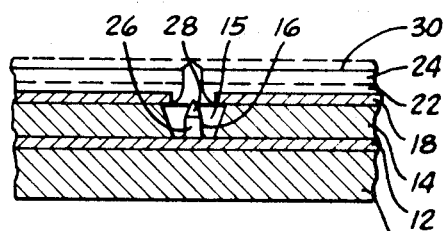
FIG_5
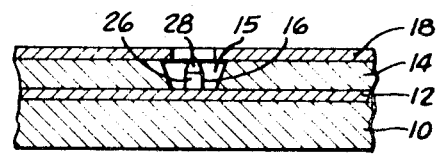
FIG_6

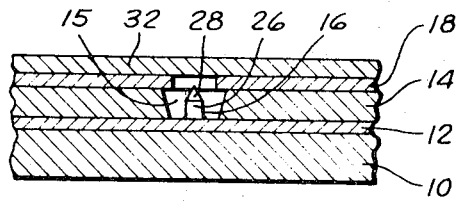
FIG_7
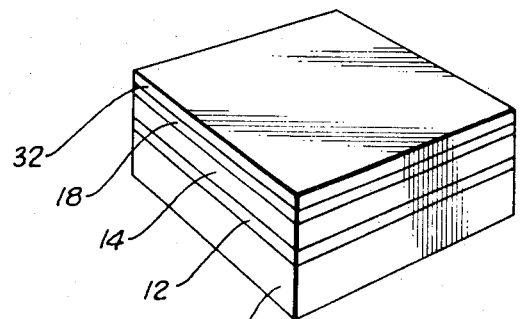
FIG_8
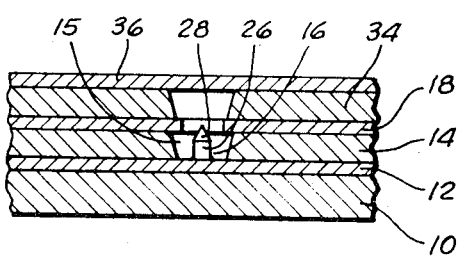
FIG_9
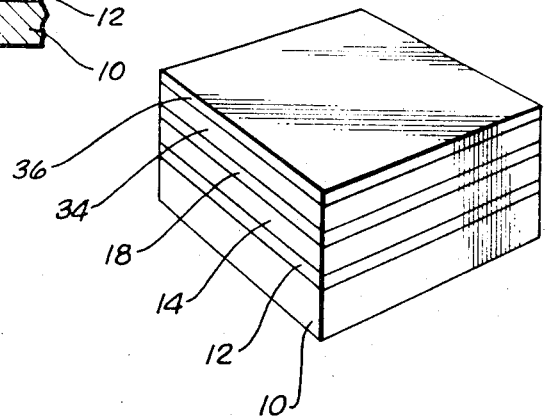
FIG_10

FIELD EMISSION CATHODE STRUCTURES, DEVICES UTILIZING SUCH STRUCTURES, AND METHODS OF PRODUCING SUCH STRUCTURES

This is a division of application Ser. No. 9,139, filed Feb. 6, 1970, now U.S. Pat. No. 3,755,704.

The present invention relates to field forming structures such as electron-emitting structures, vacuum tubes in which they are useful, and to methods for producing such structures and devices.

It is well known that an electric field on the order of several megavolts per cm can be used to produce electron emission from materials. In order to reduce the voltage required for producing electron emission to a level which is more practical, such as on the order of kilovolts, sharp needles or points are used as emitters, an electrode is spaced from the needle-like structures and a voltage of appropriate polarity (positive relative to a cathode) is applied therebetween. For field emission cathodes the electrode is made positive relative to the needle-like structures.

Despite the high emission current density capability of field emission cathodes utilizing the needle-like emitters (on the order of 10 million amps per sq cm), the total emission current from a single needle emitter is low, because of the minute size of its emitting area. Furthermore, the electrons are emitted over a large solid angle, and they obtain almost the total energy of the applied voltage within a short distance from the emitter's surface. Therefore, the formation of narrow electron beams that are suitable, for example, for use in high-power, beam-type electron tubes, requires elaborate and expensive focusing apparatus.

Parallel operation of many needle emitters to increase the total current is feasible, but the problem of forming narrow beams of electrons from a plurality of needle emitters is extremely difficult.

Many of the problems thought to be inherent in the type of cathode under consideration here have been solved by a structure and the methods of producing that structure disclosed in U.S. Pat. No. 3,453,478, "Electron Emitting Structure," Ser. No. 553,832, filed May 31, 1966, in the name of Kenneth R. Shoulders and Louis N. Heynick, and assigned to Stanford Research Institute.

In the patent referred to above a structure and method for producing such a structure is described for a multiple-needle cathode which effectively comprises two closely spaced surfaces. On the first, or emitting surface, a large number of sharp needle-like emitting sites are distributed with a packing density limited only by the fabrication technology used. The surface can be planar or curved and of a size to suit the intended application. The second surface, called an accelerator surface, is the electrode used to produce the field. It consists of a very thin foil or film of metal of the same contour as the surface with the emitter sites, and is suitably supported and electrically insulated therefrom in spacings ranging from a fraction of a micron to several microns.

The acceleratr electrode has holes therethrough the number and distribution of which correspond substantially to the number and distribution of emitting sites. Because of the minimal separation range between the emitter surface and the accelerator surface, the voltage needed to produce field emission ranges from only a few volts to about 100 volts, and the emitted electrons emerge from the holes in the accelerator with correspondingly low energies.

While the structure referred to above represents a considerable advance over any of the structures known to the prior art, the method of producing the structure can yield needle-like electrodes that are not necessarily uniform in numbers and shapes from site to site, thus introducing corresponding variations in performance. The present invention overcomes this problem by providing a single, uniform needle-like electrode at each site, each electrode having essentially identical configurations. A means of producing a single needle-like electrode at each site is described in an article by C. A. Spindt (one of the inventors of the present invention) entitled "A Thin-Film Field Emission Cathode" in the Journal of Applied Physics, Vol. 39, No. 7, 3504-3505. June 1968. The present invention represents an improvement over the method and structure described in the Spindt paper.

As previously indicated, the use of many needle-like emitters in parallel produces greatly increased emissions for a given applied acceleration voltage; however, predictability of results, i.e. predictability of emission using any selected voltage, and reproducibility of results depends upon the ability to produce and reproduce like emitter needles which are uniformly spaced from an accelerator electrode to produce the needle-like structures with uniform angles at the apices of the cones and to shape the needle-like structures. Control and reproducibility of shapes and characteristics of the needle-like emitters is even more important if the sites are to be individually addressed. Accordingly, it is an object of the present invention to provide a method whereby such results are readily attainable.

In addition to providing cathode structures that can be used in parallel, the present invention provides practical electron tubes of very small size which utilize individual emission sites as cathode structures. The individual vacuum tubes so produced can be used either singly or in parallel whether or not they are ultimately entirely separated.

In carrying out the present invention, the starting structure is a thin film sandwich metal/insulator/metal structure having a cellular array of holes produced in the upper metal and insulator layers of the sandwich whereby emission sites are produced and the edges of the upper metal accelerator electrode are effectively exposed to the upper surface of the lower metal film electrode. This structure may be produced by methods known to the art, for example, by methods described in the Shoulders/Heynick U.S. Pat. No. 3,453,478, Ser. No. 553,832, mentioned above, or in the application of Donovan V. Geppert, Ser. No. 697,800, filed Jan. 15, 1968 and entitled "Electronic Emitting Structures and Methods of Production," now abandoned.

In order to produce the single needle-like protuberance which constitutes an individual emitter in each of the holes of the cellular array, a source of emitter material is projected onto the upper surface of the film sandwich essentially normal to the surface while, at the same time, a source of masking material is directed at the same surface at a shallow grazing angle from all sides of the holes in the cellular array, as by using multiplicity of appropriately distributed sources or by using a single source and rotating the substrate. Thus, the holes in the upper metal layer are gradually closed with the masking material thereby shaping the metallic emitter material being deposited at the bottom of the holes of the cellular array. Relative rates of deposition of the two material sources are controlled to determine shape of emitter members. In particular, relative rates of deposition from the two sources may simultaneously be varied to create controlled shapes of the needle-like structures. After the holes are essentially closed off with the masking material, the emitter members each have the appearance of a needle-like pedestal structure. If the emission sites are to be used for a total source, individually addressable or otherwise, the masking material is selectively removed, thereby reopening the holes in the upper metal layer to permit electron emission out of the holes. If the emitters are to be used in individual diodes, the masking material may constitute a sealing conducting electrode. Additional insulating and conductive layers can be added to the open sandwich to provide multielectrode control of the electron optical characteristics as well as the current emerging from the holes. Multi-element vacuum tubes can be produced by closing off the holes in the topmost layer of the multi-layer sandwich.

The novel features which are believed to be characteristic of the invention are set forth with particularity in the appended claims. The invention itself, however, both as to its organization and method of operation together with further objectives and advantages thereof, may best be understood by reference to the following description taken in connection with the accompanying drawing in which:

FIG. 1 is an enlarged isometric view of a portion of an electron emitter constructed in accordance with this invention;

FIGS. 2 through 6, inclusive, are cross-sectional views taken along the lines 2 — 2 of FIG. 1 for successive steps in the method of producing the structure of FIG. 1;

FIGS. 7 and 8 are respectively enlarged cross-sectional and isometric views, one embodiment of a miniature diode constructed in accordance with the present invention; and FIGS. 9 and 10 are respectively enlarged cross-sectional and isometric views of one embodiment of a triode constructed in accordance with the present invention.

FIG. 1 illustrates one embodiment of the invention which comprises a substrate 10 which may be of a ceramic or metal material. This substrate is provided solely for the purpose of supporting the emitting structure and, if the cathode structure can be made substantial enough without the support, it may be omitted. The cathode emitting sandwich is made starting with a metal film 12 deposited directly on the substrate 10. In the embodiment illustrated, the film 12 is made of a refractory metal, such as molybdenum or tungsten. In order to insulate electrodes of the final cathode structure and to form a support structure for an accelerator electrode, a dielectric film 14, such as aluminum oxide, is deposited over the surface of metal film 12 or emitter electrode and is provided with a plurality of apertures 15 and thus has the form of a cellular grid or array of a desired mesh size. This mesh may be produced by a number of means including providing a mask over the electrode 12, depositing the insulating film or layer 14 and removing the masking material, as by selective etching, to provide the cellular array of apertures 15 in the insulating film 14 which ultimately form emitting sites or locations. Alternatively, the dielectric film 14 may be deposited as a continuous film and subsequently micro-machined to yield the desired mesh or array structure.

The accelerator electrode or film 18 may then be formed by depositing a metal layer on the dielectric film 14. If the dielectric film 14 is provided with apertures 15 therein, it is most convenient to form the accelerator electrode film 18 by depositing it upon the surface at a grazing incidence while rotating the substrate 10 about an axis normal to its surface. If, however, the dielectric film is formed as a solid, it may be more desirable to apply the accelerator film electrode 18 to the entire surface and then micro-machine through both the accelerator film 18 and the insulating layer 14 effectively to expose the upper surface of the lower emitter electrode 12 to the edges of the accelerator electrode 18.

Alternative methods of producing the metal/insulator/metal film sandwich 11 on the substrate 10 are discussed in patent applications of Donovan V. Geppert, Ser. No. 697,800, filed Jan. 15, 1968, now abandoned; and Shoulders, Crost, and Zinn, U.S. Pat. No. 3,500,102, Mar. 10, 1970, Ser. No. 639,928, filed May 15, 1967. Since the method of producing the metal/insulator/metal cathode structure thus far described does not constitute a part of the present invention, further details on this part of the method of producing the sandwich are not given here.

A single needle-like emitting protuberance 16 is provided in each of the apertures 15 of the cellular cathode structure. The needle-like emitters 16 are preferably all of the same size and shape and formed of the same material as the emitter electrode 12, hence the needle-like emitting protuberances 16 may be of one of the refractory metals such as molybdenum or tungsten.

For producing the desired field emission, a potential source 20 is provided with its positive terminal connected to accelerator electrode 18 and its negative terminal connected to emitter electrode 12. The potential source may be made variable for the purpose of controlling the electron emission current. Upon application of a potential between the electrodes 12 and 18 an electric field is established between the emitting protuberances 16 and the accelerating electrode 18, thus causing electrons to be emitted from the protuberances 16 through the holes in electrode 18.

In order to give some indication of the size and dimensions of the various films and holes, and not by way of limitation, the initial metal film 12 of molybdenum (in the embodiment illustrated) is deposited to a thickness of between one-fourth to 1 micron on a substrate 10 which may be, for example, ceramic, sapphire, or molybdenum. The insulating film of aluminum oxide 14 may be anywhere from one-half to 2 microns in thickness. The accelerating film or electrode 18 may be on the order of one-fourth to 1 micron thick. In one structure the apertures 15 have a diameter of 2 microns on 6 micron centers, or about $2.8 \times 10^4$ emission sites per sq cm. The emitting protuberances or cones 15 appear to be about 1 micron in diameter at the base and they taper to sharp points at the level of the accelerator electrode 18.

In order to understand the steps in one method used in the fabrication of the emitter, reference may be had specifically to FIGS. 2 through 6, inclusive, which represent sections through one emitting site in the array illustrated in FIG. 1. FIG. 2 illustrates the metal/insulator/metal cathode sandwich structure 11 without the emitting protuberance 16 formed within the particular emitting site. That is, FIG. 2 shows a starter structure consisting of only the substrate 11, a film of metal 12 on the substrate 10, the dielectric insulating layer 14, and the upper accelerator film electrode 18 with an aperture 15 through the upper electrode 12 and insulating layer 14. In preparation for a later step, the starter structures are heat treated in vacuum at 1,000° C in order to render the alumina (the dielectric insulating layer 14 used in this particular embodiment) not-etchable with 95° C orthophosphoric acid. If other etchants and other insulating materials are used or if the material added in the next step is not to be removed, this step may be eliminated. However, the release material utilized in the next manufacturing step is one which can be removed readily with the 95° C orthophosphoric acid and therefore the materials described here are highly compatible, thus the heat-treat step is used.

The next step in the manufacture of one embodiment is illustrated in FIG. 3. Here a film of material 22, which in this embodiment is a mixture of molybdenum-alumina, is deposited from a composite source of molybdenum-alumina at a grazing angle while the substrate is rotated about an axis perpendicular to its surface. Thus, a lip is built up around the rim of each cavity or aperture 15 without filling the cavities in intermediate dielectric layer 18. The purpose of the film 22 is to provide a release layer for selectively removing film 22 and films subsequently deposited thereon, such as films 24 and 30 in FIG. 5. Either the substrate 10 can be rotated, as is preferred, or the composite material can be deposited at a grazing angle from all sides of the substrate, as by providing a source which rotates around, or multiple sources all around the substrate.

A subsequent deposition step is made utilizing a source which is normal to the surface of the substrate to deposit an emitter material which is preferably the same refractory material, e. g. molybdenum, as the metal emitter electrode 12 or a more resistive material, e.g. a molybdenum composition. The result of this deposition step is seen in FIG. 4, wherein a film 24 of the new source material is shown deposited upon the film of molybdenum-alumina composite material 22 and, more importantly, a cylindrical pedestal 26 is formed at the bottom of the aperture 15 directly upon the metal electrode 12. The diameter of the pedestal 26 is essentially the same as the aperture remaining through the film 22 on upper accelerating electrode 18 and its height is selected by controlling the amount of material deposited.

In order to provide the sharp, needle-like tip 28 shown in FIG. 5 and thereby complete the needle-like emitting protuberance 16, a simultaneous deposition from the two sources described above is performed. That is, simultaneously molybdenum-alumina material is deposited at a grazing incidence, and the emitter material, e. g. molybdenum, is deposited straight on the substrate surface. In this step, the purpose of the deposition of grazing incidence is to provide a mask of decreasing diameter holes for the deposition of emitter material on pedestal 26. Thus, as additional emitter material is deposited on pedestal 26 (and on film 22) the molybdenum-alumina composite masking material gradually closes the aperture at the upper lip of the cavity 15. The closure is indicated by the additional film 30 deposited on the molybdenum film 24 which in FIG. 5 is shown as being completely closed. In this manner a cone-shaped, needle-like point 28 is formed on the cylindrical pedestal 26 to complete the needle-like protuberance 16.

In an alternative embodiment, the step in which the pedestal 26 is formed may be eliminated, and simultaneous deposition from the two sources can be performed after deposition of the release layer 22. In this embodiment, the needle-like tip 28 is based directly on film 12 and extends toward film 18, and its height-to-base diameter ratio is controlled by suitably selecting the relative rates of deposition from the perpendicular and grazing-incidence sources.

FIG. 6 illustrates the final structure after the films 22, 24, and 30 are removed. In the embodiment illustrated, the removal is accomplished by etching with a 95° C orthophosphoric acid which does not affect the heat treated alumina insulating dielectric layer 14. According to the preferred embodiment, this finished structure is heat treated in vacuum at about 1000° C for cleaning.

It will be appreciated that an important way to control characteristics of emission involves shaping the needle-like emitters. The relative rates of deposition of the masking material (at grazing incidence) and the emitting material (at normal incidence) can be varied during deposition in a manner to produce emitter cones or protuberances 16 with curved or other shaped sides and of various cone angles. Further, depositions at grazing and normal incidence can be formed sequentially in small alternate increments to build up points with ridged sides. Either or both of these variations can be used independently to control the sharpness of these points (angle at the apex) and the distance of the apices from the accelerator film 12.

The structure illustrated and thus far described was tested electrically in a $1 \times 10^{-9}$ torr vacuum environment. Field emission out of the anode holes to an external electrode was obtained from all active areas. Current values of up to 100 microamps per emitting site were reached at sandwich voltages of between 25 and 200 volts.

Thus it is seen that the field emitter structure is provided and the method of producing such structures is provided wherein the number and packing density of emitting sites may be made extremely high. Further, a method is provided to produce such a structure in a highly reproducible fashion.

Utilization of a resistive material for pedestal 26 of the needle-like structure 16 is of special importance where the protuberances are utilized in parallel either to provide a total array of field producing devices or as parallel connected individual vacuum tubes. Resistive pedestals 26 in parallel connected devices provide an automatic emission equalization between the needle-like structures 16 and other device electrodes in parallel connected devices.

A practical diode of very small size is produced utilizing the structure and general method described in connection with FIG. 5 of the drawings. A diode is produced when the accelerating electrode release layer 22 and closing films 24 and 30 are made as a conductive electrode (either in a continuous step of one material or in multiple steps as described of conductive material) to comprise an anode for a diode. Individual diodes may then be separated or the total structure may be left intact to produce an array of parallel connected diodes. Alternatively, the structure may be left intact but the upper electrode (anode) may be divided so that the cathodes may be connected to one potential and individual device anodes in different circuits.

The remainder of the illustrated devices, in general have the same elements as those described earlier and therefore common elements are given the same reference numerals to simplify the description and drawings. The diode of FIG. 7 is formed by sealing a conductive electrode 32 (anode) directly over the conductive accelerating electrode 18 of the structure of FIG. 6. This may be done over a full array or the array may be divided and then the upper electrode 32 sealed on. Again the diodes may have common anode 32 and cathode 12 electrodes for full parallel operation, the anode 32 may be divided to provide individual diodes in an array or the array may be divided to form separate individual diodes as illusrated in FIG. 8.

FIGS. 9 and 10 illustrate a triode version of structures described. The structure of FIG. 9 can take any of the forms described above relative to the diodes and cathodes, including the form of separate individual triodes as illustrated in FIG. 10.

The triodes of FIGS. 9 and 10 start with the structure of FIG. 6. That is, they incorporate the substrate 10 electrode cathode, electrode 12 with the cathode structure 26 on it, insulating layer 14 separating cathode electrode 12 and the accelerating electrode 18. In this case accelerating electrode 18 is effectively used as a control electrode. The triode anode 36 is formed of upper conductive electrode 35 which is separated from control electrode 18 by an insulating layer 34. Again the total device is a vacuum-tight structure.

While particular embodiments of the invention are shown, it will be understood that the invention is not limited to these structures since many modifications may be made both in the material and arrangement of elements. It is contemplated that the appended claims will cover such modifications as fall within the true spirit and scope of this invention.

What is claimed is:

1. The method of manufacturing an electric field producing structure, starting with a structure which includes a pair of parallel metal electrodes insulatingly separated by a dielectric film, one of said pair of electrodes and said dielectric film both having a plurality of apertures therethrough whereby edges of said one electrode around said apertures is effectively exposed to a surface of the other of said pair of electrodes, said method comprising the steps of:
   a. first, depositing a masking material at a shallow grazing angle on said one of said pair of electrodes thereby to provide a release layer on the said one electrode and build up a lip or mask of controlled diameter around the rim of each cavity therein;
   b. second, depositing a conductive metallic emitting material substantially perpendicular to the plane of said pair of electrodes whereby said conductive material is deposited on said second electrode within said apertures, thereby forming cylindrical pedestal-like protuberances within said apertures;
   c. third, simultaneously depositing masking material at a shallow grazing angle on said one of said pair of electrodes and depositing conductive metallic emitting material substantially perpendicular to the plane of said pair of electrodes whereby a conical emitting protuberance is formed on said pedestal-like protuberance; and
   d. four, subsequently removing all masking and said deposited conductive material from said one of said pair of electrodes.

2. The method of manufacturing an electric field producing structure starting with a structure which includes a pair of metal electrodes insulatingly separated by a dielectric film one of said pair of electrodes and said dielectric film both having a plurality of apertures therethrough whereby edges of said one electrode around said apertures is effectively exposed to a surface of the other of said pair of electrodes, said method comprising the steps of:
   a. heat-treating the composite substrate in vacuum at 1,000° C, thereby rendering the the said dielectric film non-etchable with 95° C orthophosphoric acid;
   b. simultaneously rotating said composite substrate about an axis perpendicular to its surface and depositing a film at a grazing angle from a source of masking material including alumina whereby a lip is thereby built up around the rim of each cavity;
   c. depositing molybdenum from a source perpendicular to the substrate surface, thereby to build a pedestal on the exposed surface of said other one of said pair of electrodes;
   d. simultaneously rotating said composite substrate, depositing molybdenum from said second source and the masking material including alumina from said first source, thereby to close the cavity as the pedestal grows, the forming a cone-shaped emitting tip on said pedestal;
   e. etching the composite structure with 95° ortho-phosphoric acid, thereby etching away the masking material, thus leaving individual cone-shaped spikes on each of the exposed surfaces of the other one of said pair of electrodes protruding toward the edges of said one electrode within the apertures.

* * * * *